(12) United States Patent
Agapov et al.

(10) Patent No.: US 9,038,131 B1
(45) Date of Patent: May 19, 2015

(54) SYSTEM AND METHOD OF VALUATING RESOURCE IN A COMPUTER NETWORK FOR COMPLIANCE WITH REQUIREMENTS FOR A COMPUTER SYSTEM

(71) Applicant: Kaspersky Lab ZAO, Moscow (RU)

(72) Inventors: Andrey A. Agapov, Moscow (RU); Andrey A. Kulaga, Moscow (RU); Stanislav S. Alexeev, Moscow (RU)

(73) Assignee: Kaspersky Lab ZAO, Moscow (RU)

( * ) Notice: Subject to any disclaimer, the term of this patent is extended or adjusted under 35 U.S.C. 154(b) by 0 days.

(21) Appl. No.: 14/197,371

(22) Filed: Mar. 5, 2014

(30) Foreign Application Priority Data

Dec. 5, 2013 (RU) ................................ 2013153766

(51) Int. Cl.
*H04L 29/06* (2006.01)
*G06F 17/00* (2006.01)
*G06F 21/56* (2013.01)

(52) U.S. Cl.
CPC .......... *H04L 63/1441* (2013.01); *G06F 21/566* (2013.01); *H04L 63/20* (2013.01); *H04L 63/10* (2013.01)

(58) Field of Classification Search
CPC ................................ H06L 63/20; H06L 63/10
USPC ............................................................ 726/1
See application file for complete search history.

(56) References Cited

U.S. PATENT DOCUMENTS

| 6,980,927 | B2 | 12/2005 | Tracy et al. |
| 7,680,754 | B2 | 3/2010 | Hillier |
| 7,975,286 | B1 * | 7/2011 | Fickey et al. ................... 726/1 |
| 8,176,561 | B1 * | 5/2012 | Hurst et al. ................... 726/25 |
| 8,479,257 | B1 * | 7/2013 | Lloyd et al. ................... 726/1 |
| 8,584,247 | B1 * | 11/2013 | Patil ................................ 726/25 |
| 2003/0050718 | A1 | 3/2003 | Tracy et al. |
| 2007/0226721 | A1 * | 9/2007 | Laight et al. ................ 717/154 |
| 2009/0300179 | A1 * | 12/2009 | Srinivasan ................... 709/225 |
| 2009/0300711 | A1 * | 12/2009 | Tokutani et al. ................. 726/1 |
| 2011/0313978 | A1 * | 12/2011 | Chatterjee ................... 707/690 |
| 2012/0173443 | A1 * | 7/2012 | Gerashchenko et al. ...... 705/317 |
| 2013/0227697 | A1 * | 8/2013 | Zandani ........................ 726/25 |
| 2013/0254833 | A1 * | 9/2013 | Nicodemus et al. ............. 726/1 |

* cited by examiner

*Primary Examiner* — Dede Zecher
*Assistant Examiner* — Jason C Chiang
(74) *Attorney, Agent, or Firm* — Arent Fox LLP; Michael Fainberg

(57) ABSTRACT

Disclosed are systems and methods for valuating compliance of computer resources, including valuating compliance of a hardware or software resource of a computer system with requirements for the computer system; valuating compliance of one or more objects of interest associated with the hardware or software resource with requirements for the objects of interest; and valuating overall compliance of the hardware or software resource based on the compliance of said hardware or software resource with the requirements for the computer system and the compliance of the one or more objects of interest associated with said hardware or software resource with the requirements for the objects of interest.

17 Claims, 4 Drawing Sheets

SYSTEM AND METHOD OF VALUATING RESOURCE IN A COMPUTER NETWORK FOR COMPLIANCE WITH REQUIREMENTS FOR A COMPUTER SYSTEM

CROSS-REFERENCE TO RELATED APPLICATIONS

This application claims benefit of priority under 35 U.S.C. 119(a)-(d) to a Russian Application No. 2013153766 filed on Dec. 5, 2013, which is incorporated by reference herein.

TECHNICAL FIELD

The present invention relates to the field of network security and, more specifically, to systems, methods and computer program products for valuating resources available within a computer network for compliance with requirements for a computer system.

BACKGROUND

The trend in development of business today is for offices of all modern companies, regardless of their size, to have a corporate computer network. One of the advantages of having a corporate network is the possibility of quickly exchanging various information between company employees by means of personal computers (PCs) which are part of the network.

However, a corporate network and its network infrastructure form a complex system and require professional setup and management. It is very important to monitor the PCs in the network, and especially the applications that are installed and run on the PCs in the corporate network, which allows maximum safeguarding of the corporate network against attacks and various losses of confidential information. For these purposes, a technology exists for monitoring applications, also known as "application control."

There are various approaches to controlling the launching of a program (software or application) that are carried out by application control systems. As a rule, the control is carried out through the use of a list of application control rules, making it possible to monitor the launching or the accessing of executable files, applications, or entire file groups. One of the widespread and simple methods of control is an approach that formulates control rules that allow the launching of any application that does not appear on a list of forbidden applications, the control rules having been previously drawn up by the administrator of the corporate network. Another approach is to formulate control rules such as to allow the launching of only permitted applications, and to forbid the launching of all others (known as "default deny"). As a rule, modern application control systems perform both of these approaches, depending on the tasks of the administrator.

The principal problems when introducing an application control occur in the operation of "internal" corporate applications and updates of applications, such as: all "internal" corporate applications when introducing an application control need to be "categorized" in clear form, i.e., placed in user categories by hand or by means of automatic categorization algorithms; while updates of installed applications cannot always be automatically given "permission" to be launched. To solve such problems in the context of modern application control systems, the user category of applications is constructed on the basis of information from the indicated computers. When creating the user category, the administrator assigns a "standard"—one or more computers in the corporate network. When any executable file is launched on the "standard" computers, the system adds this file to the user category (for example, the MD5 of the file or other metadata of the file is added to the category of permitted applications). Similarly, in the functioning of the inventory task, all files found from "standard" computers are automatically entered in a specified user category. When creating this type of user category, one can process all files or only the uncategorized ones (a file not belonging to the user categories or any other categories). Thus, when a new version of an internal corporate software appears, there is no need to add it manually to the user categories or place it in a special category. It will be sufficient to install it on a "standard" computer and the files will automatically end up on the list of permitted files. The formation of a user category can also be based on a directory (e.g., folder). For example, the administrator creates a category "My files" and indicates a particular directory, and the system performs monitoring of changes in the indicated directory. When new files appear, they are automatically added to the user category. Such an approach greatly simplifies the adoption of an application control in the "default deny" mode.

However, in view of the size of modern corporate networks, the complexity of their network infrastructure, and the need to comply with a large number of requirements established by companies, there is a need for automation and a smarter approach to the selecting of "standard" computer resources by valuating all computer resources existing in the network for their compliance with the established requirements.

SUMMARY

The present invention relates to systems, methods and computer program products for valuating resources available within a computer network for compliance with requirements for a computer system.

According to an aspect, a method for valuating compliance of computer resources includes valuating, by a processor, compliance of a hardware or software resource of a computer system with requirements for the computer system; valuating compliance of one or more objects of interest associated with the hardware or software resource with requirements for the objects of interest; and valuating overall compliance of the hardware or software resource based on the compliance of said hardware or software resource with the requirements for the computer system and the compliance of the one or more objects of interest associated with said hardware or software resource with the requirements for the objects of interest.

According to another aspect, a system for valuating compliance of computer resources includes a processor configured to: valuate compliance of a hardware or software resource of a computer system with requirements for the computer system; valuate compliance of one or more objects of interest associated with the hardware or software resource with requirements for the objects of interest; and valuate overall compliance of the hardware or software resource based on the compliance of said hardware or software resource with the requirements for the computer system and the compliance of the one or more objects of interest associated with said hardware or software resource with the requirements for the objects of interest.

According to yet another aspect, a computer program product stored on a non-transitory computer-readable storage medium includes computer-executable instructions for valuating compliance of computer resources, including instructions for: valuating compliance of a hardware or software resource of a computer system with requirements for the computer system; valuating compliance of one or more objects of interest associated with the hardware or software resource with requirements for the objects of interest; and valuating overall compliance of the hardware or software resource based on the compliance of said hardware or software resource with the requirements for the computer system and the compliance of the one or more objects of interest associated with said hardware or software resource with the requirements for the objects of interest.

The above simplified summary of example aspects serves to provide a basic understanding of the invention. This summary is not an extensive overview of all contemplated aspects, and is intended to neither identify key or critical elements of all aspects nor delineate the scope of any or all aspects of the invention. Its sole purpose is to present one or more aspects in a simplified form as a prelude to the more detailed description of the invention that follows. To the accomplishment of the foregoing, the one or more aspects of the invention include the features described and particularly pointed out in the claims.

BACKGROUND

The accompanying drawings, which are incorporated into and constitute a part of this specification, illustrate one or more example aspects of the invention and, together with the detailed description, serve to explain their principles and implementations.

DETAILED DESCRIPTION

Example aspects are described herein in the context of a system, method and computer program product for valuating resources available within a computer network for compliance with requirements for a computer system. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

Figure 1:
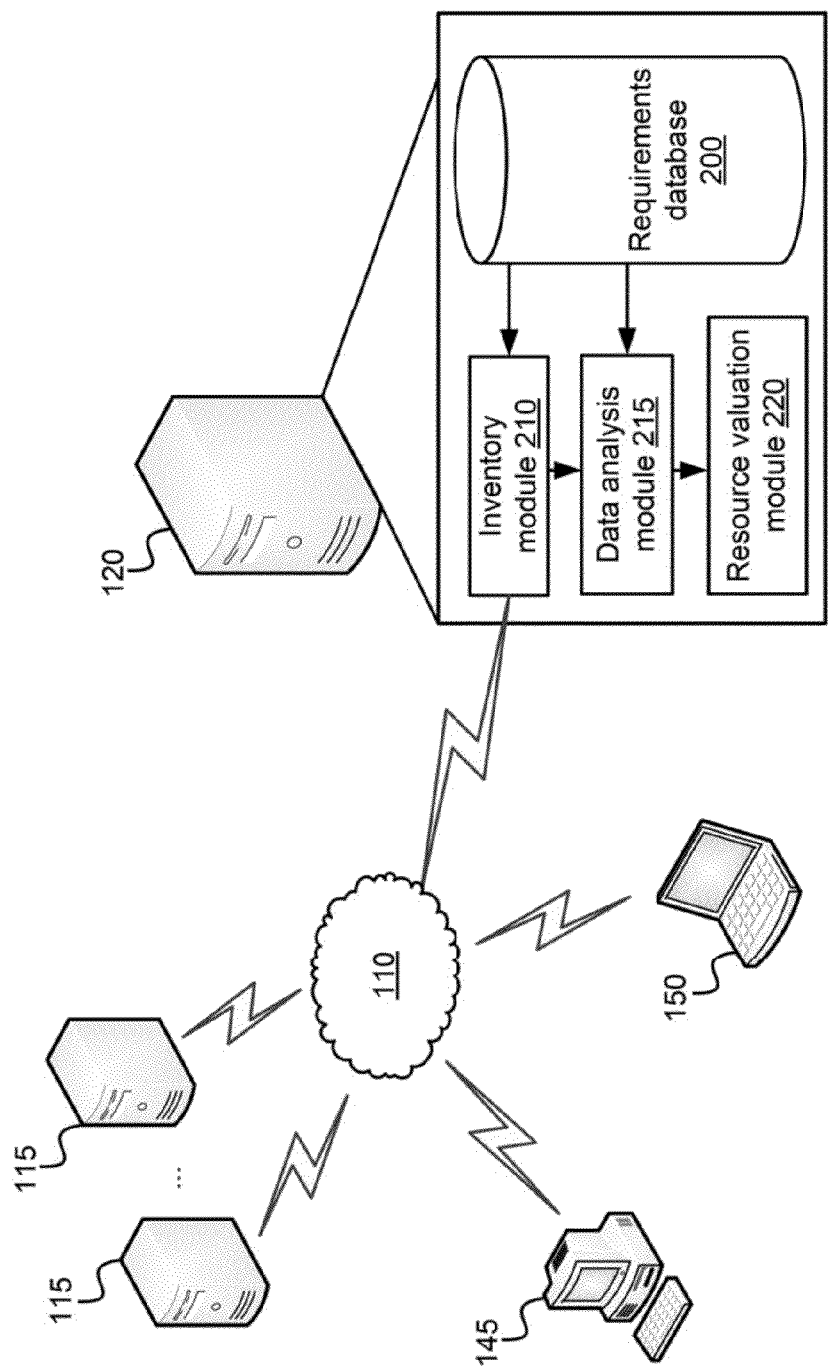
FIG. 1 shows an aspect of an example computer network.

FIG. 1 shows an aspect of an example computer network. The computer network 110 may include a number of different computer systems, such as personal computers 145, servers 115 and portable devices 150, such as notebooks or tablets. Computer resources (hereinafter "resources" for short) in the context of a computer network 110 may be devices or a portion of information to which access can be gained from computers (including from a local computer) within the given computer network 110. Resources may be not only computer systems and parts of information on them, such as directories with files, but also devices hooked up to the computer systems, such as external data media. FIG. 1 also shows a system for valuation of resources 120, which may be deployed on one or more servers, and which may have access to the computer network 110.

Two sets of criteria may be used to valuate the resources in the network. The first set of criteria may include the requirements for the computer system on which the resource being valuated resides. These requirements may also apply to the external media, since they may be directly connected to computer systems to which they are connected. The second set of criteria may establish requirements on the content of the resource being valuated. The contents of the resources may be various objects (such as files), although not all of them may influence the results of each specific resource valuation. Therefore, the objects which influence the valuation results shall be termed hereinafter "objects of interest." Thus, the second set of criteria may establish requirements on the objects of interest, making it possible to valuate the resource from the standpoint of objects of interest meeting the specified requirements. From the contents of the resources it may be possible to isolate two main types of objects of interest: files and software that is installed on the computer system. This division may be applied in the context of application control technologies, since a file for example can be both an independent object and part of an installed software, which can influence the rules applying to the given object. With the aid of the requirements for objects of interest, one may identify resources with certain types of files, such as executable files or multimedia files. One may also identify a resource on which a software of interest is present or launched, or determine a resource with the most relevant content, that is, with the maximum number of files and/or software present on the computer systems within a network. Just such a resource may be of interest to the network administrator when selecting a "standard." Thus, various resources may be identified by a combining of different requirements for the objects of interest, at least such requirements as:

file format;
different time markers (such as data and time of creation, last change, launching or opening);
frequency of occurrence of the file or software on the computer systems; and
category of the file or software (including the category of a malicious file or software, if a file or software is malicious).

In one aspect, the method of valuating resources in a network can be described with the aid of mathematical formulas. If the set of available resources in the network is designated as $R_i$ and the set of objects of interest accessible within the network is designated as 1, then $$R=\{R_1,R_2,\ldots,R_N\}; 1=\{I_1,I_2,\ldots,I_M\}, \text{ where } R_i \subset I,$$
$$i=\{1,\ldots,N\}$$

Thus, for example, $R_1=\{I_1,I_3,I_5,I_7\}$, and $R_2=\{I_4,I_6,I_7,I_8,I_{10},I_{15}\}$ and so on. The sets $R_i$ here may intersect each other, as in practice within a corporate network, for example, the majority of computers of the users may contain some identical groups of files and software (such as products of the Microsoft® company), which are necessary for routine work.

To formulate sets of requirements for the valuation of resources, it may be noted that any given requirements can be broken up into two types: critical requirements, which may be designated as $T_{cr}$, and noncritical requirements, which may be designated as T. Accordingly, the valuation of the fulfillment of the requirements may be designated as $G_{T_{cr}}=G_T=\{0; 1\}$, where a valuation of 0 means that the requirement is not fulfilled, and 1 means that it is fulfilled. A peculiarity of the critical requirements may be that failure to fulfill any one of the critical requirements may make the overall valuation of the object being valuated in regard to critical requirements take on the value of zero. The noncritical requirements may not have such a property, and on the contrary may allow a more flexible approach to issues of valuation, for example, by means of weighting factors. For each noncritical requirement $T_i \Sigma T$, the weighting factor $W_i \Sigma W$ may be introduced, thus resulting in:

$$T=\{T_1, T_2, \ldots, T_K\}; W=\{W_1, W_2, \ldots, W_K\}, \text{where } 0 > W_i > 1, \text{while } \Sigma_{i=1}^{K} W_i = 1$$

The weighting factors may be used to rank the requirements by significance in order to get more precise results. If weighting factors are not used, then all noncritical requirements may become equivalent to each other, and the maximum possible valuation may correspond to the size of the set of noncritical requirements |T|. In such a case, the best object in terms of the valuation for correspondence with the requirements may be selected from the maximum valuation score or based on crossing a given threshold. From all of the foregoing, the following designations may be introduced:

- $T_{cr}^R$ may be the set of critical requirements for the computer systems;
- $T^R$ may be the set of noncritical requirements for the computer systems;
- $W^R$ may be the set of weighting factors of the noncritical requirements for the computer systems;
- $T_{cr}^I$ may be the set of critical requirements for the objects of interest;
- $T^I$ may be the set of noncritical requirements for the objects of interest; and
- $W^I$ may be the set of weighting factors of the noncritical requirements for the objects of interest.

Then the overall valuation of a particular resource $R_k$ in terms of the requirements for the computer system on which said resource resides may be calculated by the following formula in one aspect of the present invention:

$$G_{R_k} = \prod_{i=1}^{|T_{cr}^R|} G_{T_{cr_i}^R} * \sum_{j=1}^{|T^R|} G_{T_j^R} W_j^R$$

where $G_T R_{cr_i}$ may be the valuation of the given resource in regard to the i-th critical requirement for the computer system on which the given resource resides, $|T^R_{cr}|$ may be the number of critical requirements for the computer system, $G_{T_j}R$ may be the valuation of the given resource in regard to the j-th noncritical requirement for the computer system on which the given resource resides, $|T^R|$ may be the number of noncritical requirements for the computer system, and $W_j^R$ may be a weighting factor corresponding to the j-th noncritical requirement for the computer system.

The valuation of all critical requirements for the computer systems may be represented in the form of a product so that, if only one of the established critical requirements for the computer systems is not fulfilled, the valuation may automatically become zero. On the other hand, the valuation of all the noncritical requirements may be expressed as the sum of the valuations for the compliance with each of the noncritical requirements, taking into account the corresponding weighting factors.

The overall valuation for any given object of interest $l_n$ and its compliance with the requirements for the objects of interest contained on the given resource may be calculated in one aspect of the present invention by the following formula:

$$G_{l_n} = \prod_{i=1}^{|T_{cr}^I|} G_{T_{cr_i}^I} * \sum_{j=1}^{|T^I|} G_{T_j^I} W_j^I$$

where $G_T R_{cr_i}$ may be the valuation of the given object of interest in regard to the i-th critical requirement for the objects of interest, $|T_{cr}^I|$ may be the number of critical requirements for the objects of interest, $G_{T_j}I$ may be the valuation of the given object of interest in regard to the j-th noncritical requirement for the objects of interest, $|T^I|$ may be the number of noncritical requirements for the objects of interest, and $W_j^I$ may be the weighting factor corresponding to the j-th noncritical requirement for the objects of interest.

In similar fashion, the valuation of all the critical requirements for the objects of interest may be represented in the form of a product, so that if only one of the established critical requirements for the objects of interest is not fulfilled, the valuation may automatically become zero. On the other hand, the valuation of the noncritical requirements may be expressed as the sum of the valuations for the compliance with each of the noncritical requirements, taking into account the corresponding weighting factors.

Knowing how to calculate the valuation of a computer system and an object of interest, a formula may be written for calculating the overall valuation of any given resource $R_k$ in the computer network with respect to the objects of interest, taking into account the requirements for the computer systems on which the resources are situated, and the requirements for the objects of interest, as well as the contents of the resources. This formula may appear as follows:

$$G_{R_k/I} = G_{R_k} * \sum_{r}^{|R_k|} G_{l_r}$$

where $G_{R_k}$ may be the valuation of the resource in terms of the requirements on the computer system on which the resource $R_k$ resides, $|R_k|$ may be the number of objects of interest contained on the given resource, and $Gi_r$ may be the valuation of each object contained on the given resource.

The sum formula for the valuation of the resource may appear as follows:

$$G_{R_k/I} = G_{R_k} * \sum_{r}^{|R_k|} G_{l_r} = \left( \prod_{i=1}^{|T_{cr}^R|} G_{T_{cr_i}^R} * \sum_{j=1}^{|T^R|} G_{T_j^R} W_j^R \right) * \sum_{r}^{|R_k|} G_{l_r} =$$

$$\left( \prod_{i=1}^{|T_{cr}^R|} G_{T_{cr_i}^R} * \sum_{j=1}^{|T^R|} G_{T_j^R} W_j^R \right) * \sum_{r}^{|R_k|} G_{l_r} = \left( \prod_{k=1}^{|T_{cr}^I|} G_{T_{cr_k}^I} * \sum_{z=1}^{|T^I|} G_{T_z^I} W_z^I \right)$$

where $0 > W_j^R > 1$ while $\sum_{j=1}^{|T^R|} W_j^R = 1; 0 > W_z^I > 1$ while $\sum_{z=1}^{|T^I|} W_z^I = 1$ It is easy to see that in the sum formula the resources located on a computer system not complying with even one critical requirement placed on the computer systems may automatically receive an valuation of zero. According to this formula, the higher the valuation, the more objects of interest corresponding to the requirements for the objects of interest contain a resource that may be valuated.

In another aspect, the results of the valuation of resources within the network may be presented in the form of a table, the rows of which are the resources being valuated, while the columns contain all the unique objects of interest that are available in the resources within the network. Each cell of the table may contain a numerical valuation or a dash if the resource does not contain the unique object of interest indicated in the column. The calculation of the numerical value for the valuation may be done in one of the aspects of the present invention by multiplying the valuations of the resource in terms of the requirements for the computer system on which the given resource is located, with a valuation of the unique object of interest indicated in the column with respect to the given requirements for the objects of interest, i.e., the value for the table cell (k,n) may be calculated as follows:

$$G_{R_k} * G_{I_n} = \left( \prod_{i=1}^{|T_{cr}^R|} G_{T_{cr_i}^R} * \sum_{j=1}^{|T^R|} G_{T_j^R} W_j^R \right) * \left( \prod_{i=1}^{|T_{cr}^I|} G_{T_{cr_i}^I} * \sum_{j=1}^{|T^I|} G_{T_j^I} W_j^I \right)$$

And the resulting table may appear as follows:

|  | $I_1$ | $I_2$ | ... | $I_n$ | ... | $I_M$ |
|---|---|---|---|---|---|---|
| $R_1$ | 1 | ... | ... | 0.7 | ... | 1 |
| $R_2$ | 0 | 0 | ... | 0 | ... | 0 |
| ... | ... | ... | ... | ... | ... | ... |
| $R_k$ | 0.7 | 0.49 | ... | $G_{R_k} * G_{I_n}$ | ... | 0.7 |
| ... | ... | ... | ... | ... | ... | ... |
| $R_N$ | 0.4 | 0.28 | ... | — | ... | $G_{R_N} * G_{I_M}$ |

Presenting the results of the valuation in the form of such a table provides further options for subsequent analysis, for example, the sought resource may be found by adding up the size of the sets formed by the rows, followed by arranging equal-sized sets in order of decreasing sum of the values of the elements of the sets, or by normalizing the rows of the table followed by comparing against a given standard or other methods.

In one aspect of the present invention, the following criteria may be used as the requirements for the computer systems:
compliance with a given level of security;
presence of an Internet connection;
communication channel bandwidth;
efficiency of updates;
performance of the computer system, and others.

In different aspects, different criteria may be assigned either to the critical or the noncritical types of requirements. For example, compliance with a given level of security may be a critical requirement, and it may be established from at least the following group of indicators: presence of antivirus software on the computer system, date of the last scanning of the computer system corresponding to a specified date range, available data as to the frequency of infection of the given computer system in the past, and other indicators. In another aspect, the existence of an Internet connection or the established minimum bandwidth may be critical requirements.

In terms of the requirements on the objects of interest, in similar fashion, different requirements for the objects of interest may be assigned to either critical or noncritical types of requirements in different aspects. For example, one critical requirement for the objects of interest may be their category, excluding their belonging to malicious files, or the particular frequency of occurrence of the software on the computer systems within the network, if the administrator is interested in only actively used copies of the software among the users, and so on.

Figure 2:
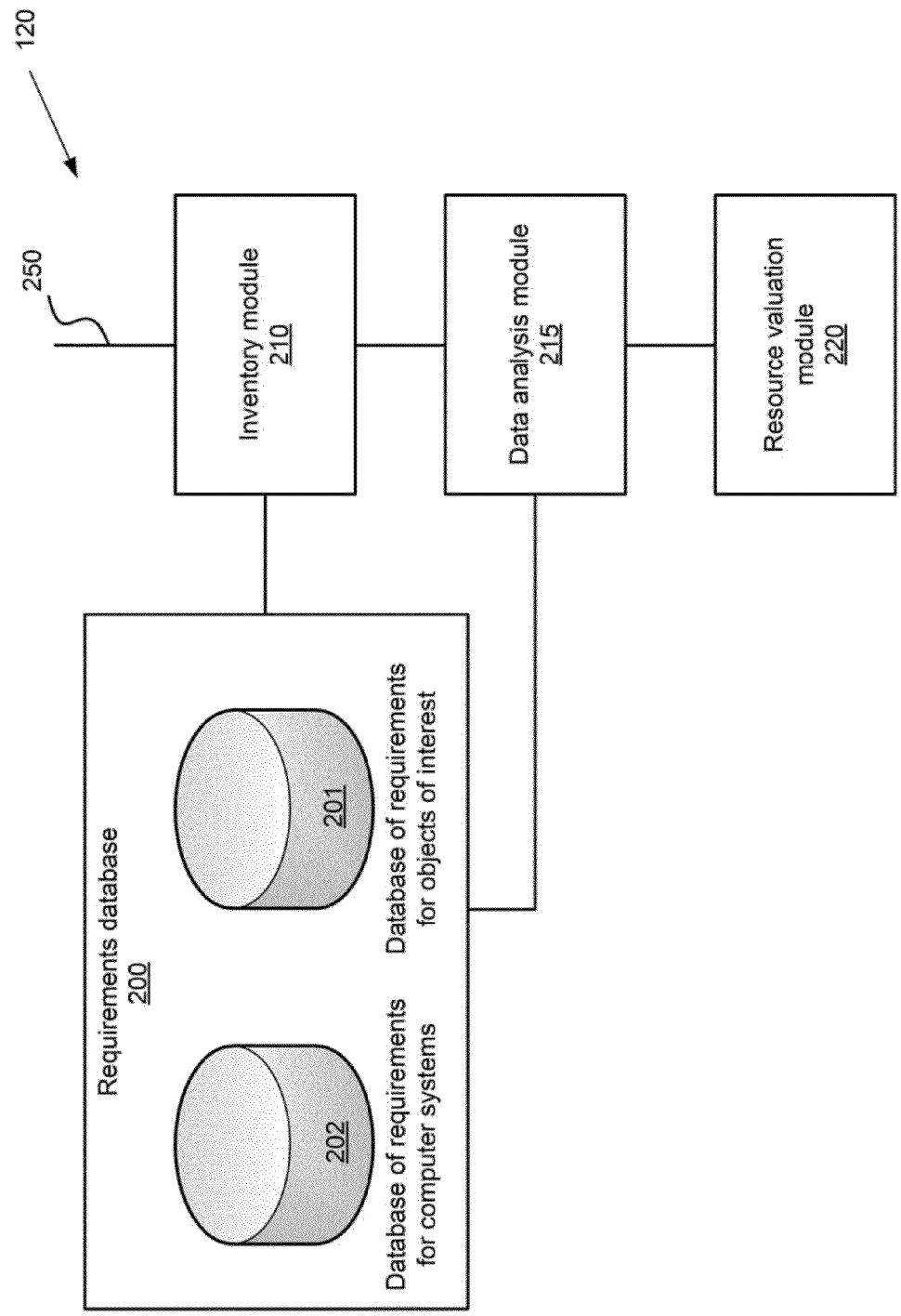
FIG. 2 shows an aspect of an example system for valuating resources in a computer network.

FIG. 2 shows an aspect of an example system for valuation of the resources of a computer network 120. According to this diagram, the inventory module 210 of the computer network 120 may have access 250 to the computer network 120 and may gather various information pertaining to both the computer systems and their contents. In particular, in one aspect of the present invention, the inventory module 210 of the computer network 120 may gather information on the resources present in the computer systems within the computer network 120, and may formulate a list of resources from this. In one aspect, the inventory module 210 of the computer network 120 in the process of gathering information on the resources available in the computer systems may check the computer systems for compliance with the established requirements for the computer systems from a database of requirements for the computer systems 202 of a requirements database 200. And computer systems not meeting the established requirements for the computer systems may be excluded from further processing based on the results of the check. Thus, the resources located on computer systems that have been eliminated from further processing may not end up on the resulting list of resources. Likewise, in one aspect of the present invention, the inventory module 210 of the computer network 120 may gather information on all objects of interest present in the resources from the resulting list of resources and may send all the information to a data analysis module 215.

In one aspect, if in the process of gathering information on the resources present on the computer systems or information on the objects of interest present in the resources, one or more of the computer systems was not available at least because the computer system was turned off or the computer system was involved in performing a resource-hungry computing operation, the information gathering procedure may be performed again afterwards.

The data analysis module 215 may receive the information on the objects of interest from the network inventory module 210 and may check this information for compliance of each object of interest with established requirements for the objects of interest from a database of requirements for the objects of interest 201 of the requirements database 200. The data analysis module 215, in turn, may send all available information to a resource valuation module 220.

The resource valuation module 220 in one aspect of the present invention may valuate each resource from the list of resources in terms of the number of objects of interest meeting the requirements for objects of interest. Given the fact that resources may be embedded in other resources, the valuation of each resource may take into account a valuation of embedded resources.

Figure 3:
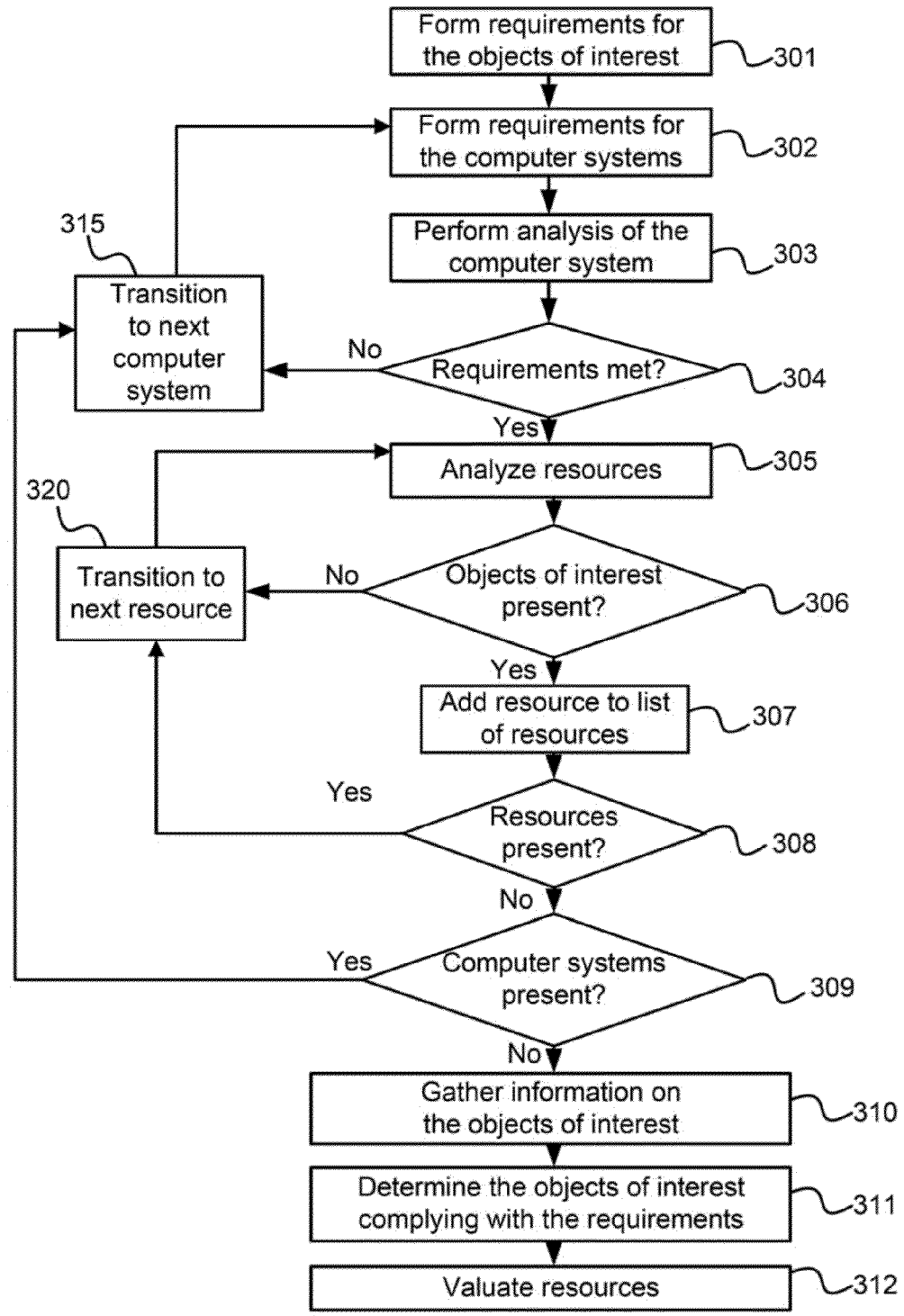
FIG. 3 shows an aspect of an example method for valuating resources in a computer network.

FIG. 3 shows an aspect of an example method for valuation of resources in a computer network. According to this method, in step 301 the requirements for the objects of interest may be formed. At this stage, one may establish which criteria need to be met and which properties must be possessed by the objects of interest on the resources being valuated. The requirements may also be apportioned between critical and noncritical ones. Objects of interest failing even one critical requirement may receive a score of zero. In similar fashion, in step 302 the requirements may be formed for the computer systems and apportioned between critical and noncritical requirements. Then, in step 303, an analysis of the computer system may be performed in regard to the compliance with the requirements for the computer systems as established in step 302. If the computer system analyzed in step 304 does not meet the established requirements for the computer systems, which in fact means that the computer system being analyzed fails even one critical requirement for the computer systems, it may then be excluded from the further processing and a transition to step 315 may occur to the next computer system available within the network. If the computer system meets the requirements in step 304, then in this aspect of the invention the method may transition to the stage of analysis of the resources 305 contained on the given computer system, in order to eliminate in step 306 from the list of resources formed in step 307 those resources not containing even one object of interest. The analysis of the resources may be done recursively, with a given depth of recursion, and it may eliminate from the list those resources not containing either objects of interest or other embedded resources containing objects of interest. In the given method, such resources may not be placed on the list of resources formed in step 307, and the method in step 320 may transition to the next resource, as long as there are still resources available for analysis 305 after step 308. Once there are no more resources for further analysis on the given computer system, the method may make a check at step 309 for the presence of accessible computer systems. If the outcome of the check is affirmative, the method may transition at step 315 to the next computer system accessible within the network. After the list of resources has been formed, information may be gathered in step 310 on the objects of interest within the resources on the resulting list of resources. It must be noted that information gathered on the same object on different resources may be different, for example, in terms of the operating features of the computer system or the ways of using the given object by the user of the given computer system on which the resource containing the given object resides. Thus, in valuating the objects of interest for compliance with the requirements specified in step 301 for the objects of interest, the valuations of identical objects might be different. In accordance with the given method, after information is gathered on the objects of interest 310 the method may proceed to determine the objects of interest 311 complying with the requirements on the objects of interest, and may valuate them. Objects of interest not meeting the critical requirements for the objects of interest may receive a score of zero. Once again, at the end of step 312, a final valuation may be made of the resources of the computer network with regard to the objects of interest, taking into account the requirements for the computer systems on which the resources are located, and the requirements for the objects or interest and the content of the resources. In one aspect of the present invention, the valuation of the resources may be based on the number of objects of interest meeting the established requirements for the objects of interest. Thus, in one aspect of the present invention, a "standard" computer resource may be selected from all those present in the network of computer resources that meets the specified requirements.

Figure 4:
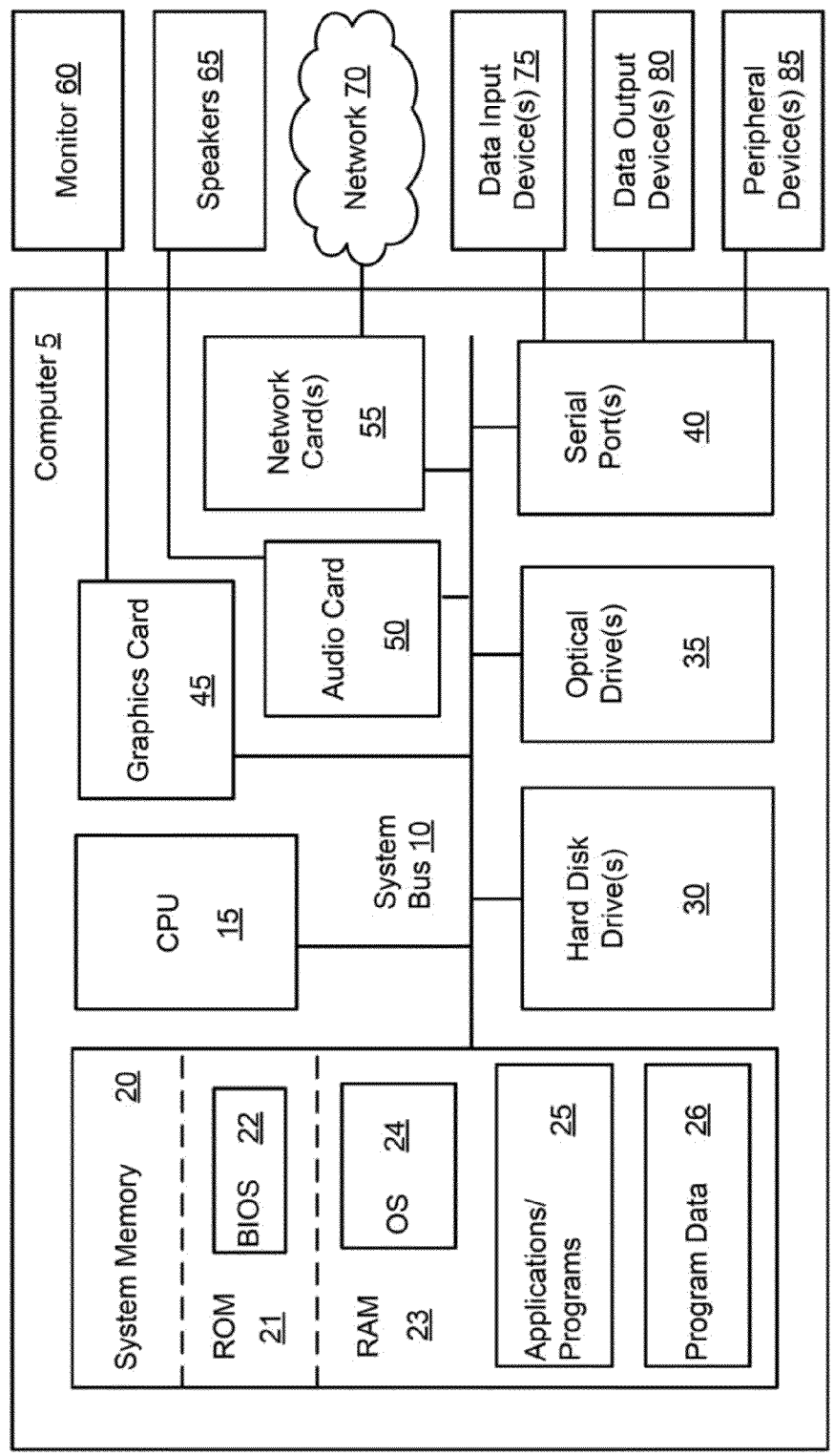
FIG. 4 shows an example of a general-purpose computer system on which systems and methods for valuating resources in a computer network may be implemented.

FIG. 4 depicts an example configuration of a general-purpose computer 5 that can be used to implement the disclosed system and methods for valuation of resources in a computer network according to various aspects of the present invention. The computer system 5 may include, but not limited to, a personal computer, a notebook, tablet computer, a smart phone, a network server, a router, or other type of computing device. As shown, computer system 5 may include one or more hardware processors 15, system memory 20, one or more hard disk drive(s) 30, optical drive(s) 35, serial port(s) 40, graphics card 45, audio card 50 and network card(s) 55 connected by system bus 10. System bus 10 may be any of several types of bus structures including a memory bus or memory controller, a peripheral bus and a local bus using any of a variety of known bus architectures. Processor 15 may include one or more Intel® Core 2 Quad 2.33 GHz processors or other type of microprocessor.

System memory 20 may include a read-only memory (ROM) 21 and random access memory (RAM) 23. Memory 20 may be implemented as in DRAM (dynamic RAM), EPROM, EEPROM, Flash or other type of memory architecture. ROM 21 stores a basic input/output system 22 (BIOS), containing the basic routines that help to transfer information between the components of computer system 5, such as during start-up. RAM 23 stores operating system 24 (OS), such as Windows® XP Professional or other type of operating system, that is responsible for management and coordination of processes and allocation and sharing of hardware resources in computer system 5. Memory 20 also stores applications and programs 25. Memory 20 also stores various runtime data 26 used by programs 25.

Computer system 5 may further include hard disk drive(s) 30, such as SATA HDD, and optical disk drive(s) 35 for reading from or writing to a removable optical disk, such as a CD-ROM, DVD-ROM or other optical media. Drives 30 and 35 and their associated computer-readable media provide non-volatile storage of computer readable instructions, data structures, applications and program modules/subroutines that implement algorithms and methods disclosed herein. Although the exemplary computer system 5 employs magnetic and optical disks, it should be appreciated by those skilled in the art that other types of computer readable media that can store data accessible by a computer system 5, such as magnetic cassettes, flash memory cards, digital video disks, RAMs, ROMs, EPROMs and other types of memory may also be used in alternative aspects of the computer system 5.

Computer system 5 further includes a plurality of serial ports 40, such as Universal Serial Bus (USB), for connecting data input device(s) 75, such as keyboard, mouse, touch pad and other. Serial ports 40 may be also be used to connect data output device(s) 80, such as printer, scanner and other, as well as other peripheral device(s) 85, such as external data storage devices and the like. System 5 may also include graphics card 45, such as nVidiao GeForce® GT 240M or other video card, for interfacing with a monitor 60 or other video reproduction device. System 5 may also include an audio card 50 for reproducing sound via internal or external speakers 65. In addition, system 5 may include network card(s) 55, such as Ethernet, WiFi, GSM, Bluetooth or other wired, wireless, or cellular network interface for connecting computer system 5 to network 70, such as the Internet.

In various aspects, the systems and methods described herein may be implemented in hardware, software, firmware, or any combination thereof. If implemented in software, the methods may be stored as one or more instructions or code on a non-transitory computer-readable medium. Computer-readable medium includes data storage. By way of example, and not limitation, such computer-readable medium can comprise RAM, ROM, EEPROM, CD-ROM, Flash memory or other types of electric, magnetic, or optical storage medium, or any other medium that can be used to carry or store desired program code in the form of instructions or data structures and that can be accessed by a processor of a general purpose computer.

In various aspects, the systems and methods described in the present disclosure in terms of modules. The term "module" as used herein refers to a real-world device, component, or arrangement of components implemented using hardware, such as by an application specific integrated circuit (ASIC) or field programmable gate array (FPGA), for example, or as a combination of hardware and software, such as by a microprocessor system and a set of instructions to implement the module's functionality, which (while being executed) transform the microprocessor system into a special-purpose device. A module can also be implemented as a combination of the two, with certain functions facilitated by hardware alone, and other functions facilitated by a combination of hardware and software. In certain implementations, at least a portion, and in some cases, all, of a module can be executed on the processor of a general purpose computer (such as the one described in greater detail in FIG. 4 above). Accordingly, each module can be realized in a variety of suitable configurations, and should not be limited to any particular implementation exemplified herein.

In the interest of clarity, not all of the routine features of the aspects are disclosed herein. It will be appreciated that in the development of any actual implementation of the invention, numerous implementation-specific decisions must be made in order to achieve the developer's specific goals, and that these specific goals will vary for different implementations and different developers. It will be appreciated that such a development effort might be complex and time-consuming, but would nevertheless be a routine undertaking of engineering for those of ordinary skill in the art having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of the skilled in the relevant art(s). Moreover, it is not intended for any term in the specification or claims to be ascribed an uncommon or special meaning unless explicitly set forth as such.

The various aspects disclosed herein encompass present and future known equivalents to the known components referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for valuating compliance of computer resources, the method comprising:
valuating, by a processor, compliance of a hardware or software resource of a computer system with requirements for the computer system;
valuating compliance of one or more objects of interest associated with the hardware or software resource with requirements for the objects of interest, wherein the one or more objects of interest comprise contents of the hardware or software resource that influence the compliance of the hardware or software resource; and
valuating overall compliance of the hardware or software resource based on the compliance of said hardware or software resource with the requirements for the computer system and the compliance of the one or more objects of interest associated with said hardware or software resource with the requirements for the objects of interest, wherein valuating the overall compliance of the hardware or software resource comprises computing a product of a value of compliance of the hardware or software resource with each of the plurality of requirements for the computer system and a sum function of values of compliance of the one or more objects of interest associated with said hardware or software resource with each of the plurality of requirements for the objects of interest.

2. The method of claim 1, wherein valuating compliance of a hardware or software resource of the computer system further includes one or more of:
valuating compliance of the hardware or software resource with a plurality of critical requirements for the computer system; and
valuating compliance of the hardware or software resource with a plurality of noncritical requirements for the computer system.

3. The method of claim 2, wherein valuating compliance of the hardware or software resource with a plurality of critical requirements further includes:
computing a product function of values of compliance of the hardware or software resource with each of the plurality of critical requirements for the computer systems.

4. The method of claim 3, wherein valuating compliance of the hardware or software resource with a plurality of noncritical requirements further includes:
computing a sum function of values of compliance of the hardware or software resource with each of the plurality of noncritical requirements for the computer systems.

5. The method of claim 4, wherein valuating compliance of the hardware or software resource with a plurality of noncritical requirements further includes:
applying weighting factors to the values of compliance of the resource with each of the plurality of noncritical requirements to rank significance of the noncritical requirements.

6. The method of claim 5, wherein valuating compliance of a hardware or software resource of the computer system further includes:
computing a product of the product function of values of compliance of the hardware or software resource with each of the plurality of critical requirements for the computer systems and the sum function of values of compliance of the hardware or software resource with each of the plurality of noncritical requirements for the computer systems.

7. The method of claim 1, wherein valuating compliance of one or more objects of interest includes one or more of:
valuating compliance of the one or more objects of interest with a plurality of critical requirements for the objects of interest; and
valuating compliance of the one or more objects of interest with a plurality of noncritical requirements for the objects of interest.

8. The method of claim 7, wherein valuating compliance of the one or more objects of interest with a plurality of critical requirements further includes:
computing a product function of values of compliance of one or more objects of interest with each of the plurality of critical requirements for the objects of interest.

9. The method of claim 8, wherein valuating compliance of the one or more objects of interest with a plurality of noncritical requirements further includes:

computing a sum function of values of compliance of one or more objects of interest with each of the plurality of noncritical requirements for the objects of interest.

10. The method of claim 9, wherein valuating compliance of the one or more objects of interest with a plurality of noncritical requirements further includes:
    applying weighting factors to the values of compliance of one or more objects of interest with each of the plurality of noncritical requirements to rank significance of the noncritical requirements.

11. The method of claim 10, wherein valuating compliance of the one or more objects of interest further includes:
    computing a product of the product function of the values of compliance of the one or more objects of interest with each of the plurality of critical requirements for the objects of interest and the sum function of values of compliance of the one or more objects of interest with each of the plurality of noncritical requirements for the objects of interest.

12. The method of claim 2, wherein the critical and noncritical requirements for the computer system include one or more of: level of security of the computer system, presence of a network connection, communication channel bandwidth, presence of certain software updates, and performance of the computer system.

13. The method of claim 7, wherein the critical and noncritical requirements for the objects of interest include one or more of: type of software files, presence of malicious files, and frequency of occurrence of software objects on the computer systems within a network.

14. A system for valuating compliance of computer resources, the system comprising:
    a processor configured to:
        valuate compliance of a hardware or software resource of a computer system with requirements for the computer system;
        valuate compliance of one or more objects of interest associated with the hardware or software resource with requirements for the objects of interest, wherein the one or more objects of interest comprise contents of the hardware or software resource that influence the compliance of the hardware or software resource; and
        valuate overall compliance of the hardware or software resource based on the compliance of said hardware or software resource with the requirements for the computer system and the compliance of the one or more objects of interest associated with said hardware or software resource with the requirements for the objects of interest, wherein, to valuate the overall compliance of the hardware or software resource, the processor is configured to compute a product of a value of compliance of the hardware or software resource with each of the plurality of requirements for the computer system and a sum function of values of compliance of the one or more objects of interest associated with said hardware or software resource with each of the plurality of requirements for the objects of interest.

15. The system of claim 14, wherein, to valuate compliance of a hardware or software resource of the computer system, the processor is further configured to:
    valuate compliance of the hardware or software resource with a plurality of critical requirements for the computer system; and
    valuate compliance of the hardware or software resource with a plurality of noncritical requirements for the computer system.

16. A computer program product stored on a non-transitory computer-readable storage medium, the computer program product comprising computer-executable instructions for valuating compliance of computer resources, including instructions for:
    valuating compliance of a hardware or software resource of a computer system with requirements for the computer system;
    valuating compliance of one or more objects of interest associated with the hardware or software resource with requirements for the objects of interest, wherein the one or more objects of interest comprise contents of the hardware or software resource that influence the compliance of the hardware or software resource; and
    valuating overall compliance of the hardware or software resource based on the compliance of said hardware or software resource with the requirements for the computer system and the compliance of the one or more objects of interest associated with said hardware or software resource with the requirements for the objects of interest, wherein
    valuating the overall compliance of the hardware or software resource comprises computing a product of a value of compliance of the hardware or software resource with each of the plurality of requirements for the computer system and a sum function of values of compliance of the one or more objects of interest associated with said hardware or software resource with each of the plurality of requirements for the objects of interest.

17. The product of claim 16, wherein the instructions for valuating compliance of a hardware or software resource of the computer system further include instructions for one or more of:
    valuating compliance of the hardware or software resource with a plurality of critical requirements for the computer system; and
    valuating compliance of the hardware or software resource with a plurality of noncritical requirements for the computer system.

\* \* \* \* \*